(12) United States Patent
Yabumoto et al.

(10) Patent No.: US 11,095,156 B2
(45) Date of Patent: Aug. 17, 2021

(54) POWER CONVERSION DEVICE AND NON-CONTACT POWER SUPPLYING SYSTEM

(71) Applicant: Mitsubishi Electric Corporation, Chiyoda-ku (JP)

(72) Inventors: Takuya Yabumoto, Chiyoda-ku (JP); Tomokazu Sakashita, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 60 days.

(21) Appl. No.: 16/487,153

(22) PCT Filed: Dec. 15, 2017

(86) PCT No.: PCT/JP2017/045139
§ 371 (c)(1),
(2) Date: Aug. 20, 2019

(87) PCT Pub. No.: WO2018/189953
PCT Pub. Date: Oct. 18, 2018

(65) Prior Publication Data
US 2020/0274399 A1   Aug. 27, 2020

(30) Foreign Application Priority Data
Apr. 12, 2017   (JP) .............................. JP2017-078653

(51) Int. Cl.
*H02J 50/12*   (2016.01)
*H02M 3/158*   (2006.01)
*H02M 7/797*   (2006.01)

(52) U.S. Cl.
CPC ............. *H02J 50/12* (2016.02); *H02M 3/158* (2013.01); *H02M 7/797* (2013.01)

(58) Field of Classification Search
CPC .... H02J 50/12; H02J 7/00308; H02J 7/00304; H02J 2310/48; H02J 2207/20;
(Continued)

(56) References Cited

U.S. PATENT DOCUMENTS

2012/0293138 A1   11/2012   Kanzaki et al.
2015/0214847 A1   7/2015   Shimada et al.
(Continued)

FOREIGN PATENT DOCUMENTS

JP   2010-119175 A   5/2010
JP   2012-244635 A   12/2012
(Continued)

OTHER PUBLICATIONS

International Search Report dated Jan. 16, 2018 in PCT/JP2017/045139 filed on Dec. 15, 2017.
(Continued)

*Primary Examiner* — Toan T Vu
(74) *Attorney, Agent, or Firm* — Xsensus LLP

(57) ABSTRACT

A power conversion device comprises an inner coil which can transmit power between an external coil by coupling magnetically with the external coil, an inverter whose AC side is connected to the inner coil and power conversion can be performed between the AC side and a DC side and a bidirectional DC/DC converter which comprises an intermediate capacitor, is connected to the DC side of the inverter and can perform power conversion bidirectionally between a DC power source, which is connected to a side which is opposite to the side of the inverter, and the inverter, wherein in switching operation from power reception to power transmission where power reception operation is switched to power transmission operation, after control of discharging charges which are accumulated in the intermediate capacitor is performed, the power transmission operation is started.

10 Claims, 7 Drawing Sheets

(58) Field of Classification Search
CPC .... H02M 3/158; H02M 7/797; H02M 3/1588; H02M 2001/007; H02M 2001/322; B60L 2210/10; B60L 53/122
USPC .......................................................... 307/104
See application file for complete search history.

(56) References Cited

U.S. PATENT DOCUMENTS

2016/0294290 A1* 10/2016 Tamura ................... H02M 1/08
2018/0062430 A1    3/2018 Matsumoto et al.

FOREIGN PATENT DOCUMENTS

| JP | 2013-236451 A | 11/2013 |
| JP | 2015-139358 A | 7/2015 |
| JP | 2014110462 | * 11/2016 |
| WO | WO 2016/151889 A1 | 9/2016 |

OTHER PUBLICATIONS

Extended European Search Report dated Nov. 9, 2020 in European Patent Application No. 17905446.5, 10 pages.

* cited by examiner

POWER CONVERSION DEVICE AND NON-CONTACT POWER SUPPLYING SYSTEM

TECHNICAL FIELD

This invention relates to a power conversion device for performing non-contact power supplying and a non-contact power supplying system.

BACKGROUND ART

As an electric power source for electric vehicles, plug-in hybrid vehicles, etc., a battery is used. Regarding a battery, it is necessary to charge from outside, and recently, a non-contact power supplying system in which charging can be performed without contacting gets attention. Further, a battery for electric vehicles, etc. are considered to be used as a power source at home in an emergency. In this case, it is necessary to switch a power conversion device which is a power reception side to a power transmission side, and to switch a power conversion device which is a power transmission side to a power reception side.

Conventional non-contact power supplying systems have the symmetry circuit configuration comprising an inverter and a converter in which a coil for non-contact power supplying is provided at the center thereof, and have bidirectional non-contact power supplying technology in which power transmission and power reception can be switched so as to perform bidirectional operation. (For example Patent Document 1)

PRIOR ART DOCUMENT

Patent Document

Patent Document 1: JP2012-244635A

SUMMARY OF THE INVENTION

Problems to be Solved by the Invention

Regarding the above-mentioned non-contact power supplying systems, when a power transmission side and a power reception side are switched, due to a charge which remains in a capacitor which is positioned between a converter and an inverter, unintended electrical current flows in an inverter, consequently, there is the possibility such that an inverter and a converter do not operate stably.

This invention is made so as to solve the above-mentioned problems, aims to provide a power conversion device which can operate stably in a case where power reception is switched to power transmission, and a non-contact power supplying system in which the above-mentioned power conversion device is used.

Means for Solving Problems

A power conversion device according to this invention comprises an inner coil which can transmit power between an external coil by coupling magnetically with the external coil, an inverter whose AC side is connected to the inner coil and which can perform power conversion bidirectionally between the AC side and a DC side, and a bidirectional DC/DC converter, which comprises an intermediate capacitor, is connected to the DC side of the inverter and can perform power conversion bidirectionally between a DC power source, which is connected to a side which is opposite to the side of the inverter, and the inverter, wherein in switching operation from power reception to power transmission where power reception operation in which the inner coil receives power from the external coil and transmits power to the DC power source is switched to power transmission operation in which power is transmitted from the DC power source to the inner coil, after control of discharging charges, which are accumulated in the intermediate capacitor, is performed, the power transmission operation is started.

Effects of Invention

According to this invention, a power conversion device in which an operation when power transmission and power reception is switched can be performed stably and a non-contact power supplying system in which the above-mentioned power conversion device is used can be realized.

EMBODIMENTS FOR CARRYING OUT THE INVENTION

Embodiment 1

Figure 1:
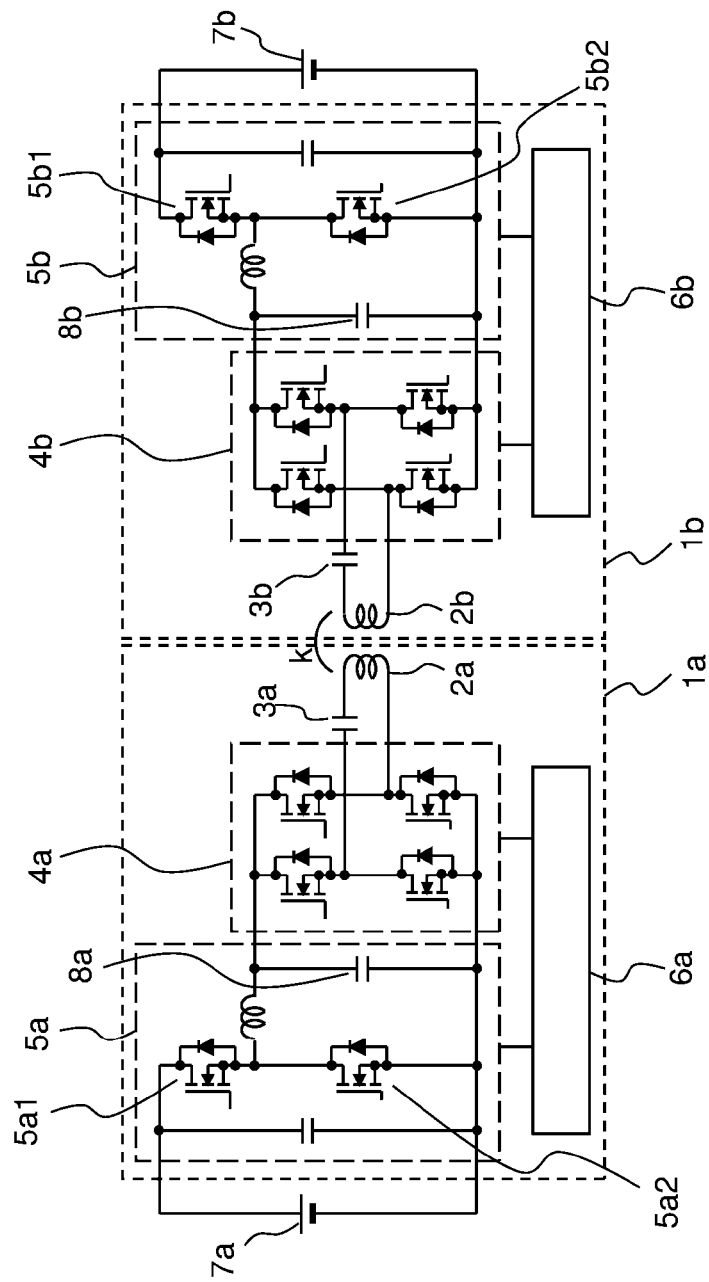
FIG. 1 is a circuit diagram showing the schematic configuration of a non-contact power supplying system according to Embodiment 1 of this invention.

FIG. 1 is a diagram for showing a basic configuration of a non-contact power supplying system according to Embodiment 1 of this invention. A non-contact power supplying system comprises a first power conversion device 1a and a second power conversion device 1b, and it is configured such that power supplying from the first power conversion device 1a to the second power conversion device 1b and power supplying from the second power conversion device 1b to the first power conversion device 1a can be switched. The first power conversion device 1a comprises a bidirectional DC/DC converter 5a which is connected to a DC power source 7a, an inverter 4a which is connected to the bidirectional DC/DC converter 5a, an intermediate capacitor 8a which is connected between the bidirectional DC/DC converter 5a and the inverter 4a, a resonance capacitor 3a which is connected to the inverter 4a and a coil 2a for non-contact power supplying. Further, the bidirectional DC/DC converter 5a comprises two semiconductor switches and it is configured such that in a case of power transmission operation when the first power conversion device 1a functions of power transmission, a voltage step-down operation in which a voltage which is supplied from the DC power source 7a is stepped down so as to supply to the intermediate capacitor 8a can be performed, and in a case of power reception when the first power conversion device 1a functions of power reception, a voltage step-up operation in which a voltage of the intermediate capacitor 8a is stepped up so as to supply to the DC power source 7a can be performed. As above mentioned, the DC/DC converter 5a is a DC/DC converter which can convert a DC voltage bidirectionally, therefore, the DC/DC converter 5a refers to a bidirectional DC/DC converter. A semiconductor switch which is provided at an upper stage for switching when a voltage is stepped down refers to a voltage step-down switching device 5a1, and a switch which is provided at a lower stage for operating when a voltage is stepped up refers to a voltage step-up switching device 6a2. The first power conversion device 1a comprises a controller 6a which controls semiconductor switches of the inverter 4a and the bidirectional DC/DC converter 5a.

Further, the second power conversion device 1b comprises a bidirectional DC/DC converter 5b which is connected to a DC power source 7b, an inverter 4b which is connected to the bidirectional DC/DC converter 5b, an intermediate capacitor 8b which is connected between the bidirectional DC/DC converter 5b and the inverter 4b, a resonance capacitor 3b which is connected to the inverter 4b and a coil 2b for non-contact power supplying. Further, in the same way as that of the bidirectional DC/DC converter 5a, the bidirectional DC/DC converter 5b comprises two semiconductor switches and it is configured such that in a case of power transmission operation when the second power conversion device 1b functions of power transmission, a voltage step-down operation can be performed, and in a case of power reception when the second power conversion device 1b functions of power reception, a voltage step-up operation can be performed. An element which is provided at an upper stage for switching when a voltage is stepped down refers to a voltage step-down switching device 5b1, and a switch which is provided at a lower stage for operating when a voltage is stepped up refers to a voltage step-up switching device 5b2. The second power conversion device 1b comprises a controller 6b which controls semiconductor switches of the inverter 4b and the bidirectional DC/DC converter 5b.

In the above mentioned configuration of the first power conversion device 1a and the second power conversion device 1b, the coil 2a for non-contact power supplying and the coil 2b for non-contact power supplying are connected magnetically with a magnetic coefficient k so as to be able to transmit power each other. Further, in the above mentioned, the first power conversion device 1a comprises a resonant capacitor 3a and the second power conversion device 1b comprises a resonance capacitor 3b, that is, the first power conversion device and the second power conversion device are resonant type inverters. However, a power conversion device to which this invention is applied is not always required to be a power conversion device in which a resonant capacitor is provided and resonant operation is utilized. It is only necessary such that the first power conversion device 1a and the second power conversion device 1b comprise a coil at a side of AC of the inverter, respectively and both of coils are disposed so as for them to be coupled magnetically each other.

In the configuration shown in FIG. 1, it is supposed such that a DC power source 7a which is connected to the first power conversion device 1a is a DC power source which is generated by rectifying AC of a power system, for example, or a DC power source which is generated by a solar power system. On the other hand, a DC power source 7b which is connected to the second power conversion device 1b is supposed to be a battery of electric vehicle, for example. Normal operation of a non-contact power supplying system according to Embodiment 1 is supposed to be an operation in which a battery 7b is charged from the DC power source 7a which is at a side of the first power conversion device 1a. Further, in a case where a trouble happens in a power system when a battery is charged and sudden power outrage is generated, for example, the state in which power transmission is necessary so as to utilize the energy which is accumulated in a battery at a power system side is supposed, it is necessary for operations of the first power conversion device 1a which performs power transmission and of the second power conversion device 1b which performs power reception operation to be stopped, for an operation of the second power conversion device to be switched to power transmission and for operation of the first power conversion device 1a to be switched to power reception. This invention is an invention which is applied to a case in which the above mentioned switching of power transmission and power reception is required.

A basic operation of a non-contact power supplying system according to Embodiment 1 will be described. The state in which a charge is not accumulated in all capacitors of the first power conversion device 1a and the second power conversion device 1b refers to an initial state. In the initial state, when power transmission is started from the first power conversion device 1a to the second power conversion device 1b, first, a high frequency operation of the first power conversion device 1a is started. Here, a high frequency operation refers to a state in which a gate signal (for example, 80 kHz constant) is inputted in switching devices which are provided at an inverter, and the switching devices perform a switching operation (it is also expressed such that simply, an inverter performs a switching operation). At this time, the bidirectional DC/DC converter 5a of the first power conversion device 1a is not operated, and main circuit voltage of the inverter 4a is zero, therefore, power transmission is not started.

Next, an operation of the bidirectional DC/DC converter 5b of the second power conversion device 1b is started. Here, an operation of the bidirectional DC/DC converter 5a refers to the state in which a gate signal is inputted with certain on-duty to switching devices of the bidirectional DC/DC converter 5b and the switching devices are turned ON/OFF so as to perform a switching operation.

Figure 2:
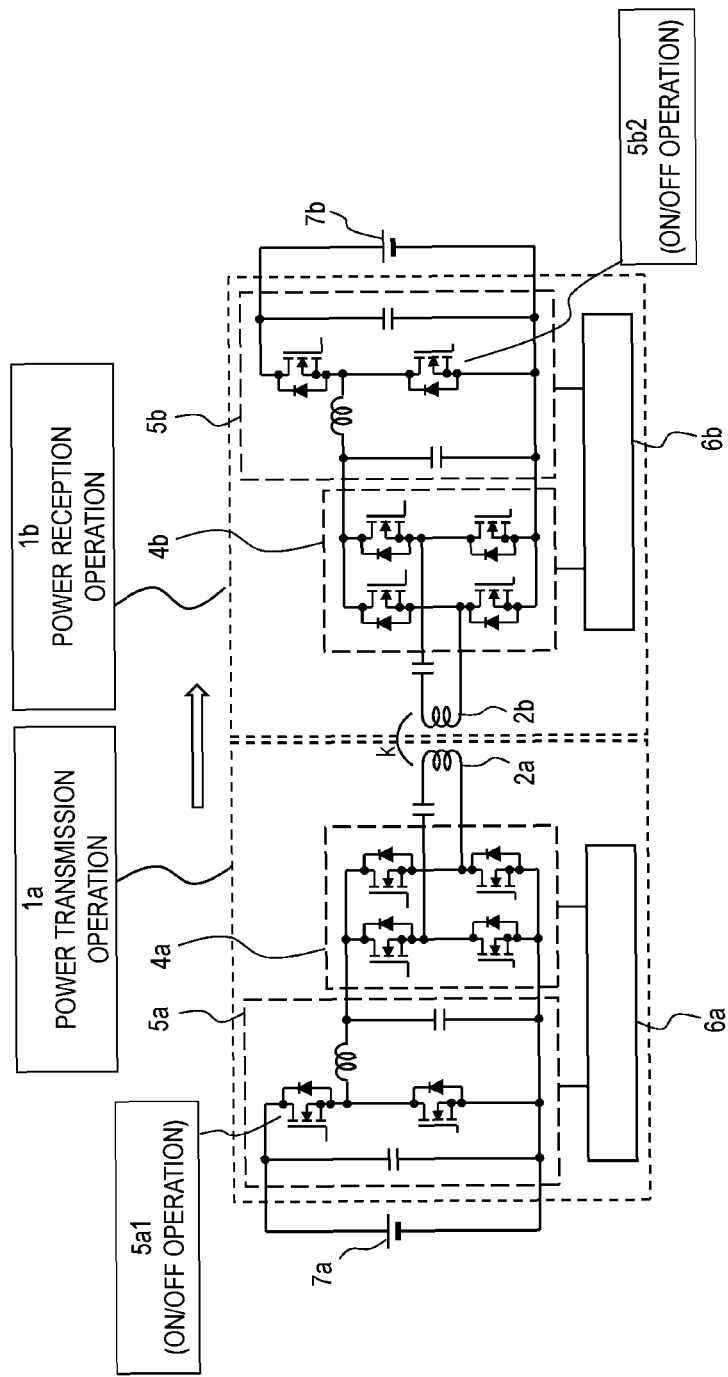
FIG. 2 is a diagram for describing an operation when power is transmitted to one direction of a non-contact power supplying system according to Embodiment 1 of this invention.

Next, a voltage step-down switching device 5a1 of the bidirectional DC/DC converter 5a of the first power conversion device 1a is turned ON/OFF so as to start a voltage step-down operation. By performing the voltage step-down operation, an amount of power transmission is controlled to be a necessary amount. By starting a voltage step-down operation of the bidirectional DC/DC converter 5a of the first power conversion device 1a, power is supplied to the inverter of the first power conversion device 1a, and a high frequency electrical current is supplied from the inverter 4a of the first power conversion device 1a to the coil 2a for non-contact power supplying. The coil 2b of the second power conversion device 1b receives power from the coil 2a for non-contact power supplying of the first power conversion device 1a, the power is rectified by a reflux diode which is connected in parallel to switching devices of the inverter 4b of the second power conversion device 1b, and rectified power is supplied to the bidirectional DC/DC converter 5b of the second power conversion device 1b. By turning the voltage step-down switching 5b2 ON/OFF, the bidirectional DC/DC converter 5b of the second power conversion device 1b performs a voltage step-up operation and supplies power to the DC power source 7b, etc. of battery which is connected to the second power conversion device 1b. As above mentioned, for example, the state in which the first power conversion device 1a is connected to a side of a power system, and the second power conversion device 1b is connected to a battery of an electric vehicle, the above mentioned operation is the state in which the battery is charged from the power system, therefore, the above mentioned state refers to a G (Grid: power system) to V (Vehicle) transmission state. FIG. 2 shows a G to V transmission state.

Further, in an initial state, when an operation of transmission of power from the second power conversion device 1b to the first power conversion device 1a is started, first, a high frequency operation of the inverter 4b of the second power conversion device 1b is started. Here, a high frequency operation refers to the state in which gate signals (for example, 80 kH constant) are inputted to switching devices of the inverter 4b, and the inverter 4b performs a switching operation. At this time, the bidirectional DC/DC converter 5b of the second power conversion device 1b is not operated, and main circuit voltage of the inverter 4b is zero, therefore, power transmission is not started.

Next, an operation of the bidirectional DC/DC converter 5a of the first power conversion device 1a is started. Here, an operation of the bidirectional DC/DC converter 5a refers to the state in which a gate signal is inputted with certain on-duty to a switching device of the bidirectional DC/DC converter 5b and the switching device is turned ON/OFF so as to perform a switching operation.

Figure 3:
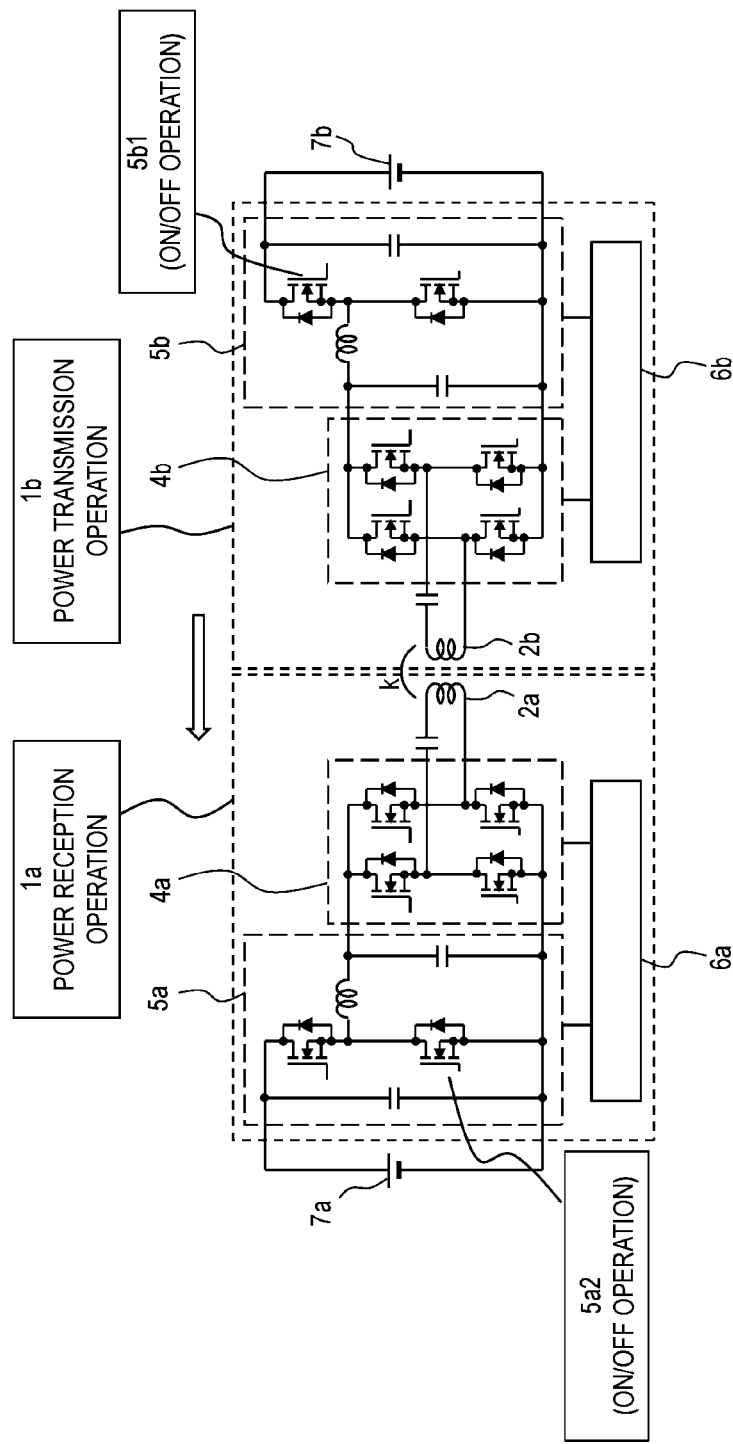
FIG. 3 is a diagram for describing an operation when power is transmitted to a direction which is opposite to that of FIG. 2 of a non-contact power supplying system according to Embodiment 1 of this invention.

Next, a voltage step-down switching device 5b1 of the bidirectional DC/DC converter 5b of the second power conversion device 1b is turned ON/OFF so as to start a voltage step-down operation. By performing the voltage step-down operation, an amount of power transmission is controlled to be a necessary amount. By starting a voltage step-down operation of the bidirectional DC/DC converter 5b of the second power conversion device 1b, power is supplied to the inverter 4b of the second power conversion device 1b, and a high frequency electrical current is supplied from the inverter 4b of the second power conversion device 1b to the coil 2b for non-contact power supplying of the second power conversion device 1b. The coil 2a for non-contact power supplying of the first power conversion device 1a receives power from the coil 2b for non-contact power supplying of the second power conversion device 1b, the power is rectified by freewheel diodes which are connected in parallel to switching devices of the inverter 4a of the first power conversion device 1a, and rectified power is supplied to the bidirectional DC/DC converter 5a of the first power conversion device 1b. The bidirectional DC/DC converter 5a of the first power conversion device 1a performs a voltage step-up operation, and supplies power to the DC power source 7a or a battery 7a which is connected to the first power conversion device 1a. The above mentioned states refers to a V to G transmission state. FIG. 3 shows a V to G transmission state.

Next, a control operation in switching a G to V transmission state to a V to G transmission state will be described.

Figure 4:
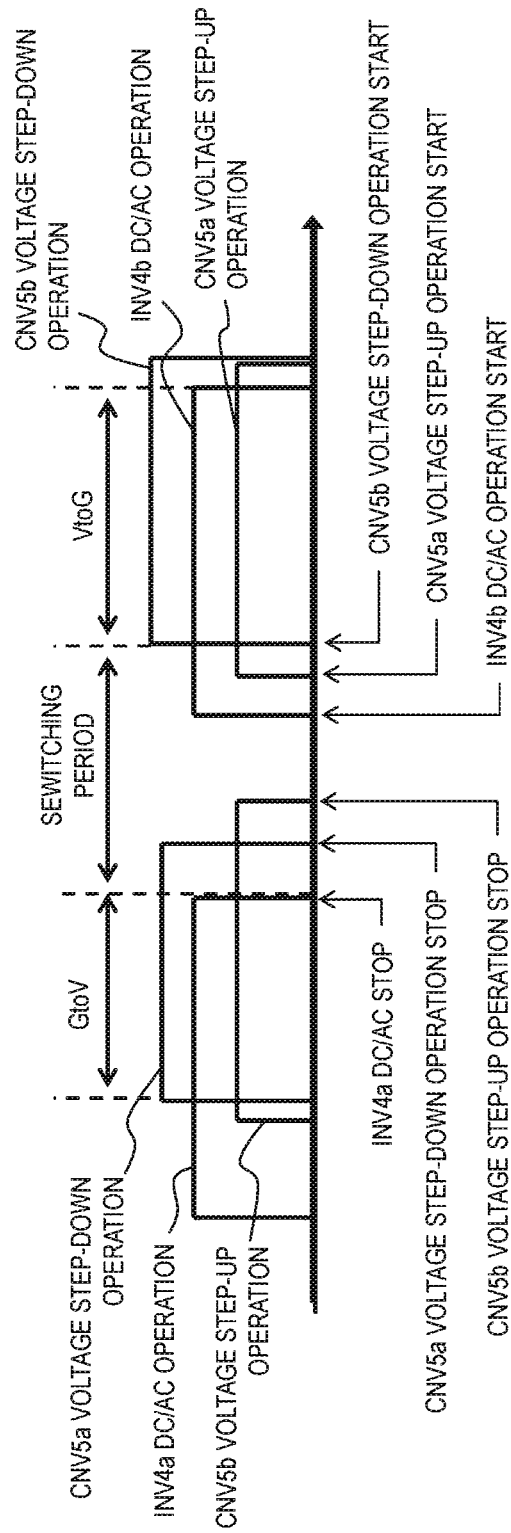
FIG. 4 is a time chart for describing the order of operation of each element of a non-contact power supplying system according to Embodiment 1 of this invention.

FIG. 4 shows a time chart in switching. Further, in FIG. 4, an inverter is indicated as INV and a converter is indicated as CNV. A DC/AC operation of the inverter 4a of the power conversion device 1a which performs power transmission operation is stopped. Concretely, all signals to be inputted to gates of switching devices of the inverter 4a are turned OFF so as to stop a switching operation. By stopping a switching operation of the inverter 4a, supplying of high frequency electric current to a coil is stopped so as to stop a non-contact power supplying operation. Next, a voltage step-down operation of the bidirectional DC/DC converter 5a of the first power conversion device 1a is stopped. Concretely, a gate signal of the voltage step-down switching device 5a1 of the bidirectional DC/DC converter 5a is turned OFF.

Figure 5:
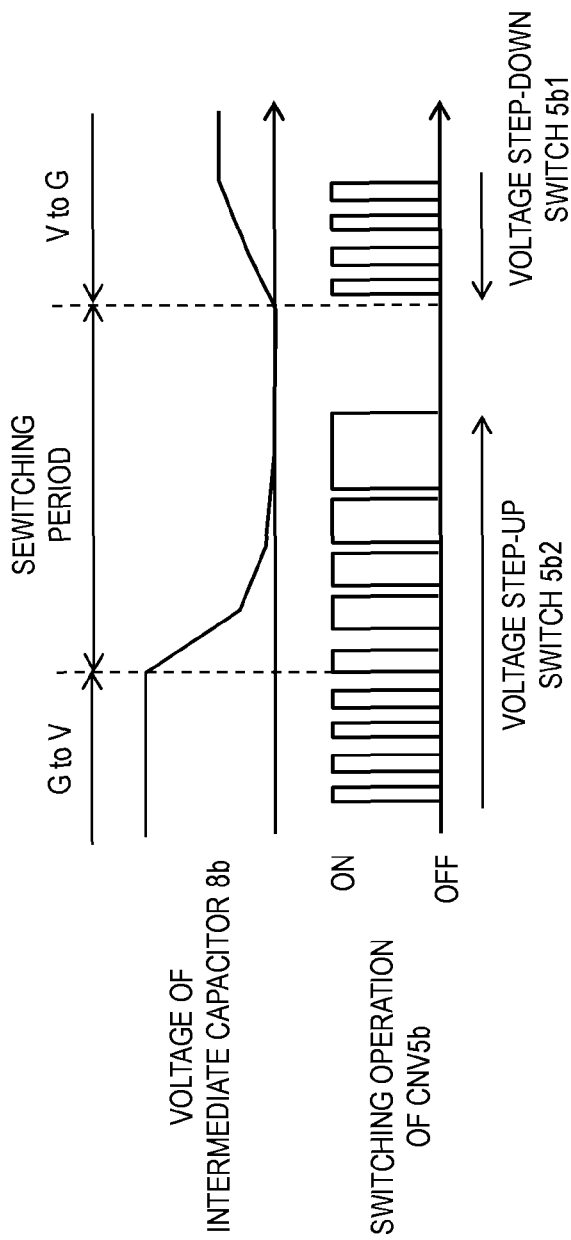
FIG. 5 is a diagram for describing an operation of switching period when power reception is switched to power transmission of a non-contact power supplying system according to Embodiment 1 of this invention.

Next, by gradually increasing duty ratio of ON (on duty) of a gate signal to be inputted to the voltage step-down switching device 5b2 of the bidirectional DC/DC converter 5b of the second power conversion device 1b which performs power reception operation, a charge which is accumulated in the intermediate capacitor 8b which is connected between the bidirectional DC/DC converter 5b of the second power conversion device and the inverter 4b of the second power conversion device is extracted. Increase of on duty will be continued until a voltage of the intermediate capacitor 8b is decreased to be zero or lower than a predetermined value which was set in advance. At a point when a voltage becomes zero or lower than a predetermined value, the voltage step-up switching device 5b2 of the bidirectional DC/DC converter 5b is transited to be always OFF. FIG. 5 shows the state of increase of on duty of the voltage step-up switching device 5b2 and voltage decrease of the intermediate capacitor 8b which is accompanied with the increase of on duty. It is not always necessary for a voltage of the intermediate capacitor 8b to be decreased completely zero, but is acceptable for the voltage to be decreased to be lower than a predetermined value, then a voltage step-up switching device of the bidirectional DC/DC converter 5b is transited to be always OFF. However, when on duty of the voltage step-up switching device 5b2 is not increased, a charge which is accumulated in the intermediate capacitor 8b cannot be extracted until a voltage becomes zero or lower than a predetermined value.

After the above mentioned operation is performed, a DC/AC conversion operation of the inverter 4b of the second power conversion device 1b is started. Here, the DC/AC conversion operation refers to the state in which a switching operation is performed by inputting gate signals (for example 80 kHz constant) to switching devices of the inverter 4b. At this time, in a case where a voltage of the intermediate capacitor 8b which is connected between the inverter 4b and the bidirectional DC/DC converter 5b is zero, power is not supplied to the coil 2b for non-contact power supplying. Further, even in a case where a voltage of the intermediate capacitor 8b is not completely zero, abnormal electric current does not flow in the coil 2b for non-contact power supplying, therefore, a DC/AC conversion operation can be started stably.

Next, a voltage step-up operation of the bidirectional DC/DC converter 5a of the first power conversion device 1a will be started. Next, a voltage step-down operation of the bidirectional DC/DC converter 5b of the second power conversion device 1b will be started. By starting a voltage step-down operation of the bidirectional DC/DC converter 5b of the second power conversion device 1b, the second power conversion device 1b performs a power transmission operation, power is supplied to the inverter 4b of the second power conversion device 1b and a high frequency electric current is supplied from the inverter 4b of the second power conversion device 1b to the coil 2b for non-contact power supplying. The coil 2a for non-contact power supplying of the first power conversion device 1a receives power from the coil 2b for non-contact power supplying of the second power conversion device 1b, the power is rectified by the inverter 4a of the first power conversion device 1a and rectified electric current is supplied to the bidirectional DC/DC converter 5a of the first power conversion device 1a. The bidirectional DC/DC converter 5a of the first power conversion device 1a performs a voltage step-up operation and supplies power to the DC power source 7a such as a battery which is connected to the first power conversion device 1a. By performing the above mentioned operation, a G to V state in which power is supplied from the first power conversion device 1a to the second power conversion device 1b is switched to a V to G state in which power is supplied from the second power conversion device 1b to the first power conversion device 1a.

Figure 6:
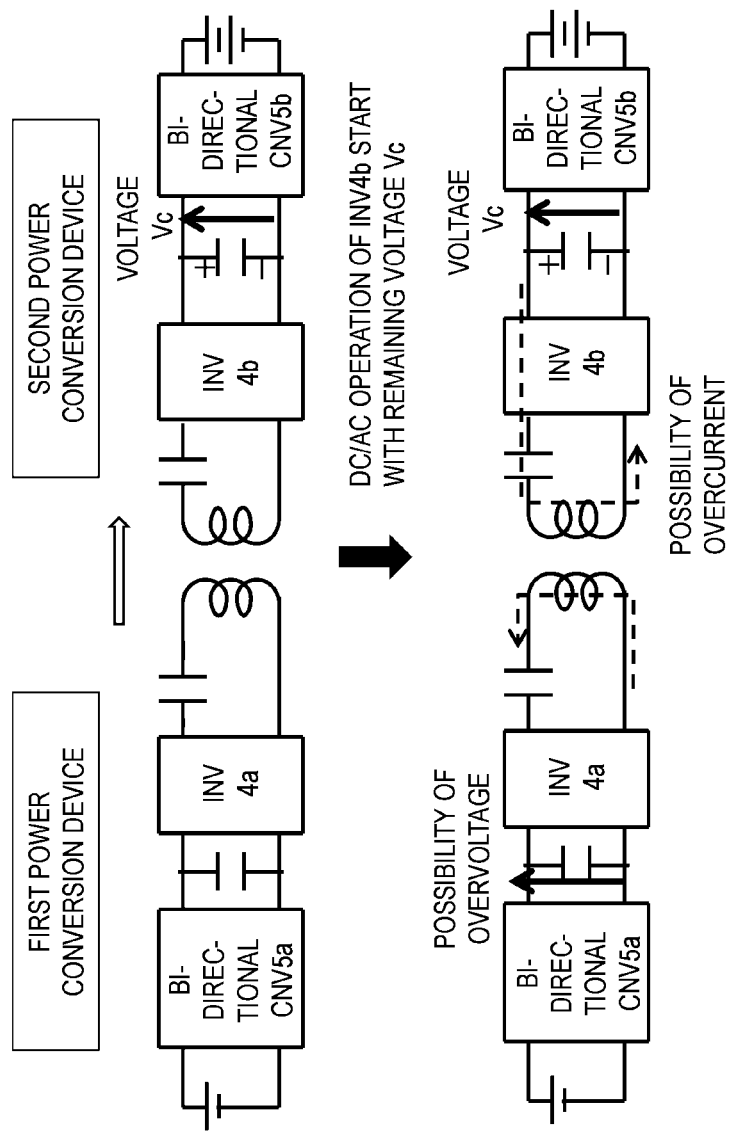
FIG. 6 is diagram for describing problems of a non-contact power supplying system according to Embodiment 1 of this invention.

Next, the details of necessity and effect of the above mentioned control method will be described. In a non-contact power supplying system in this embodiment, control of a voltage of an intermediate capacitor which is connected between a bidirectional DC/DC converter and an inverter is important subject. For example, when power supply of the first power conversion device 1a is stopped from a G to V state in which power is supplied from the first power conversion device 1a to the second power conversion device 1b, a charge which is accumulated in the intermediate capacitor 8b which is connected between the converter 5b of the bidirectional DC/DC converter 5b of the second power conversion device 1b and the inverter 4b remains. When the DC/AC conversion operation of the inverter 4b of the second power conversion device 1b is started while keeping the above mentioned state, a charge which is accumulated in the intermediate capacitor 8b instantly becomes an electric current to be supplied to the inverter 4b. The above mentioned state will be shown in FIG. 6. Usually, power transmission is controlled by a voltage step-down operation of the bidirectional DC/DC converter 5a of the second power conversion device 1b, however, at the moment, control of power cannot be performed. When a charge which is accumulated in the intermediate capacitor 8b remains as a voltage of 350V, in some cases, power which is instantly supplied exceeds several kW, therefore, in a case where the first power conversion device 1a does not require such a large power, this becomes a serious problem.

Problems which are generated in the above mentioned differ depending on a state of the first power conversion device 1a, however, a main problem is an overvoltage which is generated by unintended increase of a voltage of the intermediate capacitor 8a of the first power conversion device 1a or an over current which is generated by unintended flow of electric current to the inverter 4b of the second power conversion device 1b. Here, in switching from a G to V state to a V to G state or in switching from a V to G state to a G to V state, it is necessary to safely discharge energy which is accumulated in the intermediate capacitor. In the embodiment of this invention, at a later stage of the capacitor, a step-up converter and a DC power source such as a battery are connected in this order, therefore, even when a voltage of an intermediate capacitor is lowered than a voltage of a DC power source such as a battery, by appropriately increasing on duty of a step-up converter, all or most of charges which are accumulated in a capacitor can be transited to a DC power source such as a battery. By doing the above mentioned, a state of an intermediate capacitor can be made same as that of an initial state, therefore, an effect of switching power transmission and power reception safely and at high speed can be obtained. Further, the operation is only transiting a charge which is accumulated in an intermediate capacitor to a battery, therefore, loss is not generated, consequently, an effect of decreasing energy loss can be obtained.

As can be understood by the above mentioned description, a predetermined value which is set in advance when the above mentioned power reception of the second power conversion device 1b is completed and by the time when a voltage of the intermediate capacitor 8b is decreased to be a predetermined value which is set in advance refers to a voltage value which is set as a voltage corresponding to a charge amount which can start operate stably without causing troubles caused by charges which remain in the intermediate capacitor 8b when an operation of the inverter 4b of the second power conversion 1b is started, that is, an electric current which flows when an operation of the inverter 4b of the second power conversion device 1b starts is not an abnormal value and a voltage of the intermediate capacitor 8a of the first power conversion device 1a is not an overvoltage.

Further, in Embodiment 1, as shown in FIG. 1, an example in which the first power conversion device 1a and the second power conversion device 1b have the same configuration and an example of the symmetry configuration as a non-contact power supplying system was described. However, this invention can be applied to a case in which one of the power conversion devices has the configuration same as that of the first power conversion device 1a or that of the second power conversion device 1b which were described in Embodiment 1 even when the configuration is not a symmetry non-contact power supplying system. That is, even when the configuration in not a symmetry non-contact power supplying system, in a case when an operation of the power conversion device is switched from power reception to power transmission, before an operation of power transmission is started, by performing an operation of extracting charges in an intermediate capacitor by increasing on duty of voltage a step-up switching device of a bidirectional DC/DC converter as above mentioned, an effect of this invention can be realized.

Embodiment 2

Figure 7:
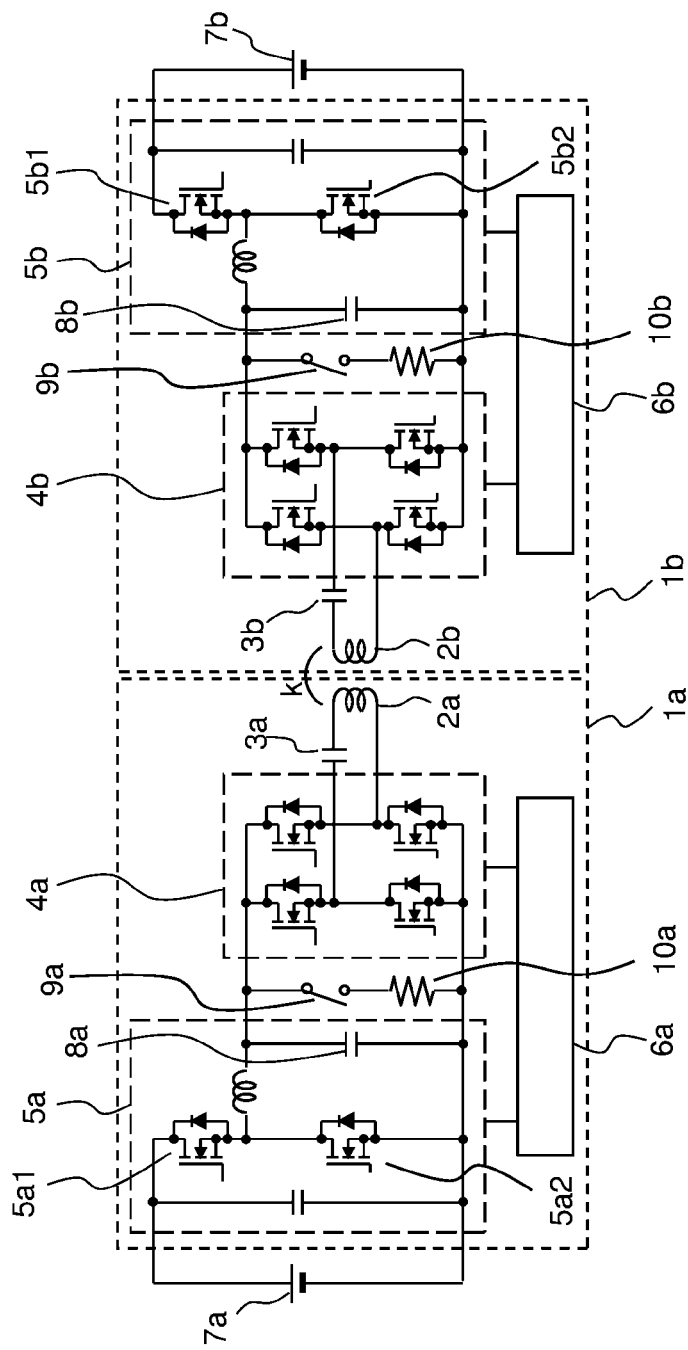
FIG. 7 is a circuit diagram showing the schematic configuration of a non-contact power supplying system according to Embodiment 2 of this invention.

FIG. 7 shows the configuration of a non-contact power supplying system according to Embodiment 2 of this invention. A basic configuration as a non-contact power supplying system according to Embodiment 2 is same as that of Embodiment 1, however, a different point is such that series body of a switch 9a (9b) and a discharge resistance 10a (10b) are connected in parallel to an intermediate capacitor 8a (8b) which is connected between an inverter and a bidirectional DC/DC converter. This switch may be a mechanical type switch such as a relay or a semiconductor switch.

A basic operation of a bidirectional non-contact power supplying system according to Embodiment 2 will be described. First, a state in which power transmission from a first power conversion device 1a to a second power conversion device 1b is stopped will be described. At this point, a state is such that charges remain in an intermediate capacitor 8b which is connected to an inverter 4b and a converter 5b. As described in Embodiment 1, in the above mentioned state, when power transmission and power reception is switched, unintended electrical current flows in an inverter.

Then, in order to discharge remaining charges, by turning the switch 9b ON, the discharge resistance 10b is connected in parallel to the intermediate capacitor 8b so as to discharge remaining charges, and power is consumed by the discharge resistance 10b. After remaining charges are discharged, the switch 9b is turned OFF and the discharge resistance 10b is cut off from the intermediate capacitor 8b.

Charge which remain in an intermediate capacitor can be discharged at a high speed, therefore, the state can be returned to an initial state at a high speed, consequently switching from a G to V state to a V to G state (or V to G state to G to V state) can be performed at a high speed.

Further, within a scope of this invention, embodiments may be combined or embodiments may be appropriately deformed or omitted.

DESCRIPTION OF REFERENCE SIGNS 1a first power conversion device
1b second power conversion device
2a, 2b coil for non-contact power supplying
4a, 4b inverter
5a, 5b bidirectional DC/DC converter
5a1, 5b1 voltage step-up switching device
5a2, 5b2 voltage step-down switching device
8a, 8b intermediate capacitor
7a, 7b DC power source
10a 10b discharge resistance

The invention claimed is:
1. A power conversion device comprising
an inner coil configured to transmit power between an external coil by coupling magnetically with the external coil;
an inverter including an AC side and a DC side, the AC side connected to the inner coil, the inverter to perform power conversion bidirectionally between the AC side and the DC side;
a bidirectional DC/DC converter including a first side and a second side which includes an intermediate capacitor, the second side connected to the DC side of the inverter and configured to perform power conversion bidirectionally between a DC power source which is connected to the first side, and the inverter, the bidirectional DC/DC converter further including a voltage step-up switch which is a voltage step-up converter during a power reception operation during which the inner coil receives power from the external coil, and during which a voltage step-up operation is performed by turning the voltage step-up switch ON/OFF and a voltage at the DC side of the inverter is stepped up and transmitted to the first side; and
controller circuitry configured to increase a duty cycle of the voltage step-up switch until a voltage of the intermediate capacitor is lowered to a predetermined value or lower, when in a switching operation which includes the power conversion device switching from power reception during which power from the inner coil is transmitted to the inverter and to the bidirectional DC/DC converter to power transmission in which power is transmitted from the DC power source through the DC/DC converter and through the inverter to the inner coil.

2. The power conversion device according to claim 1, wherein the bidirectional DC/DC converter further includes:
a voltage step-down switch, which functions during the power transmission, which turns the voltage step-down switch ON/OFF and steps down a voltage at the first side for power to be transmitted to the DC side of the inverter.

3. The power conversion device according to claim 2, wherein:
during the switching operation from power reception to power transmission, after receiving power from the external coil is stopped, by the time until a voltage of the intermediate capacitor is lowered to be a predetermined value or lower, the duty cycle of the voltage step-up switch is gradually increased.

4. A non-contact power supplying system, comprising:
two power conversion devices, each power conversion device including:
a coil;
an inverter including an AC side and a DC side, the AC side is connected to the coil, the inverter configured to perform power conversion between the AC side and the DC side bidirectionally; and
a bidirectional DC/DC converter including a first side and a second side which includes an intermediate capacitor, the second side connected to the DC side of the inverter, and configured to perform power conversion bidirectionally between a DC power source to be connected to the first side and the intermediate capacitor,
wherein the two power conversion devices are configured so that the coils are coupled magnetically to each other so as to be able to perform power transmission,
wherein one power conversion device of the two power conversion devices is a power transmission side power conversion device which performs a power transmission operation in which power is transmitted from the DC power source which is connected to the one power conversion device to the coil of the one power conversion device, and another power conversion device of the two power conversion device is a power reception side power conversion device which performs a power reception operation in which power is transmitted from the coil of the another power conversion device to the DC power source which is connected to the another power conversion device,
wherein in a switching operation of power transmission and power reception in which the power conversion device which was the power transmission side power conversion device is switched to the power reception side power conversion device and the power conversion device which was the power reception side power conversion device is switched to the power transmission side power conversion device,
the power conversion device which was the power reception side power conversion device further includes controller circuitry starts the power transmission operation after charges which are accumulated in the intermediate capacitor of the power conversion device which was the power reception side power conversion device are discharged by, using the controller circuitry, increasing a duty cycle of a voltage step-up switch of the bidirectional DC/DC converter of the power conversion device which was the power reception side power conversion until a voltage of the intermediate capacitor is lowered to be a predetermined value or lower.

5. The non-contact power supplying system according to claim 4, wherein:
the bidirectional DC/DC converter of the one power conversion device operates as a step-up converter during the power reception operation and perform a voltage step-up operation in which a voltage at the DC side of the inverter is stepped up and transmits power to the DC power source, and the bidirectional DC/DC converter of the one power conversion device operates as a step-down converter during the power reception operation and performs a step-down operation in which a voltage at the first side is stepped down and transmits power to the DC side of the inverter.

6. The non-contact power supplying system according to claim 5, wherein:

during the switching operation of power transmission and power reception, the power conversion device which was the power transmission side power conversion device stops the power transmission operation by stopping a switching operation of the inverter before the voltage step-up operation of the bidirectional DC/DC converter is stopped.

7. The non-contact power supplying system according to claim 4, wherein:

during the switching operation of power transmission and power reception, after a power transmission operation of the power conversion device which was the power transmission side power conversion device is stopped, by the time when a voltage of the intermediate capacitor of the power conversion device which was the power reception side power conversion device is lowered to be a predetermined value or lower, the duty cycle of the voltage step-up switch is gradually increased.

8. The power conversion device according to claim 1, wherein:

during the switching operation from power reception to power transmission, after receiving power from the external coil is stopped, by the time until a voltage of the intermediate capacitor is lowered to be a predetermined value or lower, the duty cycle of the voltage step-up switch is gradually increased.

9. The non-contact power supplying system according to claim 5, wherein:

during the switching operation of power transmission and power reception, after a power transmission operation of the power conversion device which was the power transmission side power conversion device is stopped, by the time when a voltage of the intermediate capacitor of the power conversion device which was the power reception side power conversion device is lowered to be a predetermined value or lower, the duty cycle of the voltage step-up switch is gradually increased.

10. The non-contact power supplying system according to claim 6, wherein:

during the switching operation of power transmission and power reception, after a power transmission operation of the power conversion device which was the power transmission side power conversion device is stopped, by the time when a voltage of the intermediate capacitor of the power conversion device which was the power reception side power conversion device is lowered to be a predetermined value or lower, the duty cycle of the voltage step-up switch is gradually increased.

* * * * *